US012483995B2

(12) United States Patent
Huber et al.

(10) Patent No.: US 12,483,995 B2
(45) Date of Patent: Nov. 25, 2025

(54) GENERATING A PROPAGATION MODEL BASED ON SAMPLING BY USER EQUIPMENT IN IDLE MODE

(71) Applicants: AT&T INTELLECTUAL PROPERTY I, L.P., Atlanta, GA (US); AT&T INTELLECTUAL PROPERTY II, L.P., Atlanta, GA (US); AT&T TECHNICAL SERVICES COMPANY, INC., Vienna, VA (US); AT&T Mobility II LLC, Atlanta, GA (US)

(72) Inventors: Kurt Huber, Ashburn, VA (US); Thomas Henderson, Alpharetta, GA (US); Daniel Vivanco, Ashburn, VA (US); Julius Fodje, Alpharetta, GA (US)

(73) Assignees: AT&T Intellectual Property I, L.P., Atlanta, GA (US); AT&T Intellectual Property II, L.P., Atlanta, GA (US); AT&T Technical Services Company, Inc., Vienna, VA (US); AT&T Mobility II LLC, Atlanta, GA (US)

( * ) Notice: Subject to any disclaimer, the term of this patent is extended or adjusted under 35 U.S.C. 154(b) by 630 days.

(21) Appl. No.: 17/829,064

(22) Filed: May 31, 2022

(65) Prior Publication Data
US 2023/0388939 A1 Nov. 30, 2023

(51) Int. Cl.
*H04W 60/04* (2009.01)
*H04W 52/24* (2009.01)
*H04W 52/28* (2009.01)

(52) U.S. Cl.
CPC ....... *H04W 52/245* (2013.01); *H04W 52/242* (2013.01); *H04W 52/285* (2013.01); *H04W 60/04* (2013.01)

(58) Field of Classification Search
None
See application file for complete search history.

(56) References Cited

FOREIGN PATENT DOCUMENTS

WO WO-2008030146 A1 * 3/2008 ............ H04W 16/18
WO WO-2012166032 A1 * 12/2012 ............ H04B 17/15

OTHER PUBLICATIONS

T. Imai, et al., Radio Propagation Prediction Model Using Convolutional Neural Networks by Deep Learning, 13th European Conference on Antennas and Propagation (EuCAP 2019), Abstract, Section II. (Year: 2019).*

(Continued)

*Primary Examiner* — Ario Etienne

(57) ABSTRACT

The technologies described herein are generally directed to generating a propagation model based on sampling by user equipment in idle mode in a fifth generation (5G) network or other next generation networks. An example method can include, based on a first location in a geographic area of a signal measurement measured by a user equipment in an idle mode, and a transmission location of the signal, estimating an estimated first path loss value. The method can further include, based on the estimated first path loss value and a second path loss value of a second carrier signal received from the carrier signal source, determining an antenna pattern of the carrier signal source. Further, the method can include based on the antenna pattern, generating a propagation model for the carrier signal source.

20 Claims, 10 Drawing Sheets

(56) References Cited

OTHER PUBLICATIONS

Lei Qiu, et al., Neural Network Prediction of Radio Propagation, Australian Communications, Abstract (Year: 2005).*
3GPP TS 36.304 [V17.0.0] (Year: 2022).*
3GPP TS 36.331 [V15.13.0] (Year: 2021).*

* cited by examiner

500

MOBILITY UPDATE MESSAGE ADDENDUM 510

- FREQUENCY OF SIGNAL IDENTIFIED 520A
- POWER LEVEL OF SIGNAL IDENTIFIED 520B
- UE CALCULATED PATHLOSS 520C
- LOCATION OF UE AT SAMPLE COLLECTION 520D
- CURRENT LOCATION 520E
- EFFECTIVE ISOTROPIC RADIATED POWER (EIRP) 520F
- EVOLVED UNIVERSAL TERRESTRIAL RADIO ACCESS NETWORK (E-UTRAN) CELL GLOBAL IDENTIFIER (ECGI) OF CELL 520G
- PHYSICAL CELL IDENTIFIER (PCI) 520H
- CURRENT FREQUENCY OF CARRIER MEASURED 520I
- REFERENCE SIGNAL RECEIVED POWER (RSRP) OF SERVING CELL, BEAM ID 520J
- IDLE CHANNEL MEASUREMENTS FROM THE PHONE 520K
- POWER ALLOCATION SETTING OF UE 520L
- MODEL OF UE 520M

FIG. 5

GENERATING A PROPAGATION MODEL BASED ON SAMPLING BY USER EQUIPMENT IN IDLE MODE

TECHNICAL FIELD

The subject application is related to different approaches to handling communication in networked computer systems and, for example, to using information from network equipment in idle and active states to improve signal propagation.

BACKGROUND

As demands for fast, high-quality wide area network connections have increased, wireless providers have implemented many new technologies, each having advantages and drawbacks over traditional approaches. New, shorter wavelength frequency bands can provide dramatically faster broadband connections to mobile devices, but because these bands can be blocked easier and have narrower beams, positioning them to offer service to user devices has been challenging.

In this environment, it can be important to generate and maintain models of signal propagation, but often there are not enough measurements available for these functions.

BRIEF DESCRIPTION OF THE DRAWINGS

The technology described herein is illustrated by way of example and not limited in the accompanying figures in which like reference numerals indicate similar elements and in which:

FIG. 5 is a diagram of a non-limiting example addendum to administrative messages that can provide additional antenna resource allocating information, in accordance with one or more embodiments.

DETAILED DESCRIPTION

Figure 1:
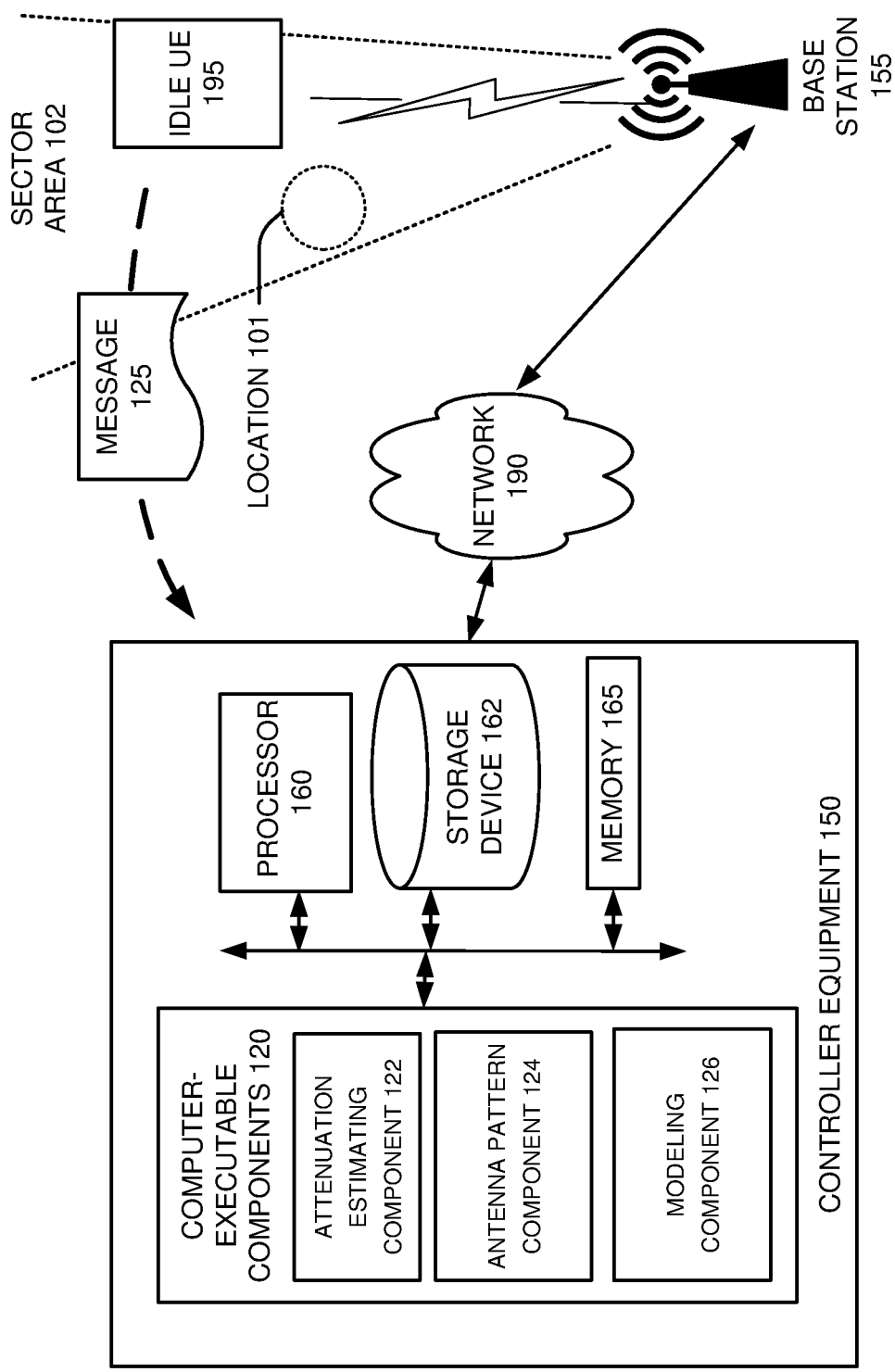
FIG. 1 is an architecture diagram of an example system that can facilitate generating a propagation model based on sampling by user equipment in idle mode, in accordance with one or more embodiments.

Generally speaking, one or more embodiments can facilitate generating a propagation model based on sampling by user equipment in idle mode. In addition, one or more embodiments described herein can be directed towards a multi-connectivity framework that supports the operation of new radio (NR, sometimes referred to as 5G). As will be understood, one or more embodiments can support control and mobility functionality on cellular links (e.g., long term evolution (LTE) or NR). One or more embodiments can provide benefits including, system robustness, reduced overhead, and global resource management.

It should be understood that any of the examples and terms used herein are non-limiting. For instance, while examples are generally directed to non-standalone operation where the NR backhaul links are operating on millimeter wave (mmWave) bands and the control plane links are operating on sub-6 GHz long term evolution (LTE) bands, it should be understood that it is straightforward to extend the technology described herein to scenarios in which the sub-6 GHz anchor carrier providing control plane functionality could also be based on NR in an SA (stand alone) configuration. As such, any of the examples herein are non-limiting examples, any of the embodiments, aspects, concepts, structures, functionalities, or examples described herein are non-limiting, and the technology may be used in various ways that provide benefits and advantages in radio communications in general.

In some embodiments the non-limiting terms "signal propagation equipment" or simply "propagation equipment," "radio network node" or simply "network node," "radio network device," "network device," and access elements can be used herein. These terms may be used interchangeably and refer to any type of network node that can serve user equipment and/or be connected to other network node or network element or any radio node from where user equipment can receive a signal. Examples of radio network node include, but are not limited to, base stations (BS), multi-standard radio (MSR) nodes such as MSR BS, gNodeB, eNode B, network controllers, radio network controllers (RNC), base station controllers (BSC), relay, donor node controlling relay, base transceiver stations (BTS), access points (AP), transmission points, transmission nodes, remote radio units (RRU) (also termed radio units herein), remote ratio heads (RRH), and nodes in distributed antenna system (DAS). Additional types of nodes are also discussed with embodiments below, e.g., donor node equipment and relay node equipment, an example use of these being in a network with an integrated access backhaul network topology.

In some embodiments, the non-limiting term user equipment (UE) is used. This term can refer to any type of wireless device that can communicate with a radio network node in a cellular or mobile communication system. Examples of UEs include, but are not limited to, a target device, device to device (D2D) user equipment, machine type user equipment, user equipment capable of machine to machine (M2M) communication, PDAs, tablets, mobile terminals, smart phones, laptop embedded equipped (LEE), laptop mounted equipment (LME), USB dongles, and other equipment that can have similar connectivity. Example UEs are described further with FIGS. 9 and 10 below. Some embodiments are described in particular for 5G new radio systems. The embodiments are however applicable to any radio access technology (RAT) or multi-RAT system where the UEs operate using multiple carriers, e.g., LTE. Some embodiments are described in particular for 5G new radio systems. The embodiments are however applicable to any RAT or multi-RAT system where the UEs operate using multiple carriers, e.g., LTE.

The computer processing systems, computer-implemented methods, apparatus and/or computer program products described herein employ hardware and/or software to solve problems that are highly technical in nature (e.g., estimating location of a UE from signal propagation information and allocating antenna resources), that are not abstract and cannot be performed as a set of mental acts by a human. For example, a human, or even a plurality of humans, cannot efficiently predict a location of a user equipment and rapidly direct multiple signals thereto (which generally cannot be performed manually by a human), with the same level of accuracy and/or efficiency as the various embodiments described herein.

Aspects of the subject disclosure will now be described more fully hereinafter with reference to the accompanying drawings in which example components, graphs and selected operations are shown. In the following description, for purposes of explanation, numerous specific details are set forth in order to provide a thorough understanding of the various embodiments. For example, some embodiments described can facilitate generating a propagation model based on sampling by user equipment in idle mode. Different examples that describe these aspects are included with the description of FIGS. 1-10 below. It should be noted that the subject disclosure may be embodied in many different forms and should not be construed as limited to this example or other examples set forth herein.

One or more embodiments described herein can improve coverage and planning processes for wireless communications networks. Once planning models have been generated that map coverage, one or more embodiments can lower cost for tuning models as well as facilitate hyper tuning of the planning models to particular connection characteristics, e.g., specific handsets, times of day and year, and customer preferences. Generally speaking, configuring network user equipment to collect and periodically transmit propagation samples while in idle mode, can result in faster and more accurate model and clutter updating for vegetation and building impairments, on a vastly greater scale and with higher resolution than alternative approaches.

It should be noted that, although the tracking area update message is frequently used for illustration herein, one having skill in the relevant art(s), given the discussion herein, would appreciate how to use different types of messages can be used for modifications described herein, e.g., to include the administrative information for functions described herein. One should further note that, although directional 5G signals are used for many of the examples herein, many of the different embodiments described and suggested by the disclosure herein, can provide beneficial results when applied to previous generations of wireless communication.

FIG. 1 is an architecture diagram of an example system 100 that can facilitate generating a propagation model based on sampling by user equipment in idle mode, in accordance with one or more embodiments. For purposes of brevity, description of like elements and/or processes employed in other embodiments is omitted.

As depicted, system 100 can include controller equipment 150 communicatively coupled via network 190 to base station 155, which can send signals intercepted by idle UE 195. Based on different conditions discussed herein, idle UE 195 can communicate message 125 via base station 155 and network 190 to controller equipment 150. In one or more embodiments, controller equipment 150 can include computer executable components 120, processor 160, storage device 162, and memory 165.

Sector area 102 (also termed antenna sector area) can refer to an area where an antenna of base station 155 can project radiation under certain circumstances and can be related to a coverage area enabled by the antenna. Although one or more examples described herein are directed to generating propagation models for wireless signals propagated into the relatively narrow beam width of a 5G antenna sector area, one having skill in the relevant art(s), given the description herein, appreciates that processes and concepts described and suggested herein can be applied to different beam widths and other signal characteristics.

A discussed further below, computer executable components 120 can include attenuation estimating component 122, antenna pattern component 124, modeling component 126, and other components described or suggested by different embodiments described herein, that can improve the operation of system 100. It should be appreciated that these components, as well as aspects of the embodiments of the subject disclosure depicted in this figure and various figures disclosed herein, are for illustration only, and as such, the architecture of such embodiments are not limited to the systems, devices, and/or components depicted therein. For example, in some embodiments, controller equipment 150 can further comprise various computer and/or computing-based elements described herein with reference to mobile handset 900 of FIG. 9, and operating environment 1000 of FIG. 10. For example, one or more of the different functions of network equipment can be divided among various equipment, including, but not limited to, including equipment at a central node global control located on the core Network, e.g., mobile edge computing (MEC), self-organized networks (SON), or RAN intelligent controller (RIC) network equipment.

In some embodiments, memory 165 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 165 are described below with reference to system memory 1006 and FIG. 10. Such examples of memory 165 can be employed to implement any embodiments of the subject disclosure.

According to multiple embodiments, storage device 162 can include, but is not limited to, RAM, ROM, EEPROM, flash memory or other memory technology, solid state drive (SSD) or other solid-state storage technology, Compact Disk Read Only Memory (CD ROM), digital video disk (DVD), blu-ray disk, or other optical disk storage, magnetic cassettes, magnetic tape, magnetic disk storage or other magnetic storage devices, or any other medium which can be used to store the desired information and which can be accessed by the computer.

According to multiple embodiments, processor 160 can comprise one or more processors and/or electronic circuitry that can implement one or more computer and/or machine readable, writable, and/or executable components and/or instructions that can be stored on memory 165. For example, processor 160 can perform various operations that can be specified by such computer and/or machine readable, writable, and/or executable components and/or instructions including, but not limited to, logic, control, input/output (I/O), arithmetic, and/or the like. In some embodiments, processor 160 can comprise one or more components including, but not limited to, a central processing unit, a multi-core processor, a microprocessor, dual microprocessors, a microcontroller, a system on a chip (SOC), an array processor, a vector processor, and other types of processors. Further examples of processor 160 are described below with reference to processing unit 1004 of FIG. 10. Such examples of processor 160 can be employed to implement any embodiments of the subject disclosure.

In one or more embodiments, computer executable components 120 can be used in connection with implementing one or more of the systems, devices, components, and/or computer-implemented operations shown and described in connection with FIG. 1 or other figures disclosed herein. For example, in one or more embodiments, computer executable components 120 can include instructions that, when executed by processor 160, can facilitate performance of operations defining attenuation estimating component 122. As discussed with FIGS. 2-6 below, attenuation estimating component 122 can, in accordance with one or more embodiments, based on a first location in a geographic area of a signal measurement of a first carrier signal measured by a user equipment in an idle mode, and a transmission location of a carrier signal source of the first carrier signal, estimate an estimated first path loss value of the first carrier signal. For example, one or more embodiments can, based on a location (of idle UE 195 in sector area 102) of a signal measurement of a first carrier signal measured by an idle UE 195 at the location, and a transmission location of base station 155 as the carrier signal source, estimate an estimated first path loss (also termed attenuation) value of the first carrier signal, e.g., from base station 155 to idle UE 195.

Further, in another example, in one or more embodiments, computer executable components 120 can include instructions that, when executed by processor 160, can facilitate performance of operations defining antenna pattern component 124. As discussed with FIGS. 3-4 below, antenna pattern component 124 can, in accordance with one or more embodiments, based on the estimated first path loss value and a second path loss value of a second carrier signal received from the carrier signal source at a second location, determine an antenna pattern of the carrier signal source. For example, one or more embodiments can, based on the estimated first path loss value of a location associated with idle UE 195, and a second path loss value of a second carrier signal received at location 101, from base station 155, determine an antenna pattern of the carrier signal source. One having skill in the relevant art(s), given the description herein, appreciates that there are different approaches that can be generate an antenna pattern for base station 155, including, but not limited to, collecting many samples over time, and determining how the allocation of different resources combine to propagate signals from the signal source in a predictable pattern.

In yet another example, computer executable components 120 can include instructions that, when executed by processor 160, can facilitate performance of operations defining modeling component 126. As discussed herein, in one or more embodiments, modeling component 126 can, based on the antenna pattern, generate a propagation model for the carrier signal source within the geographic area. For example, one or more embodiments can, based on the antenna pattern, generate a propagation model for antenna sector area 102 of base station 155. As is understood by one having skill in the relevant art(s), given the description herein, based on the propagation model, a parameter of transmission of the carrier signal source from base station 155 can be adjusted to improve network performance.

Figure 2:
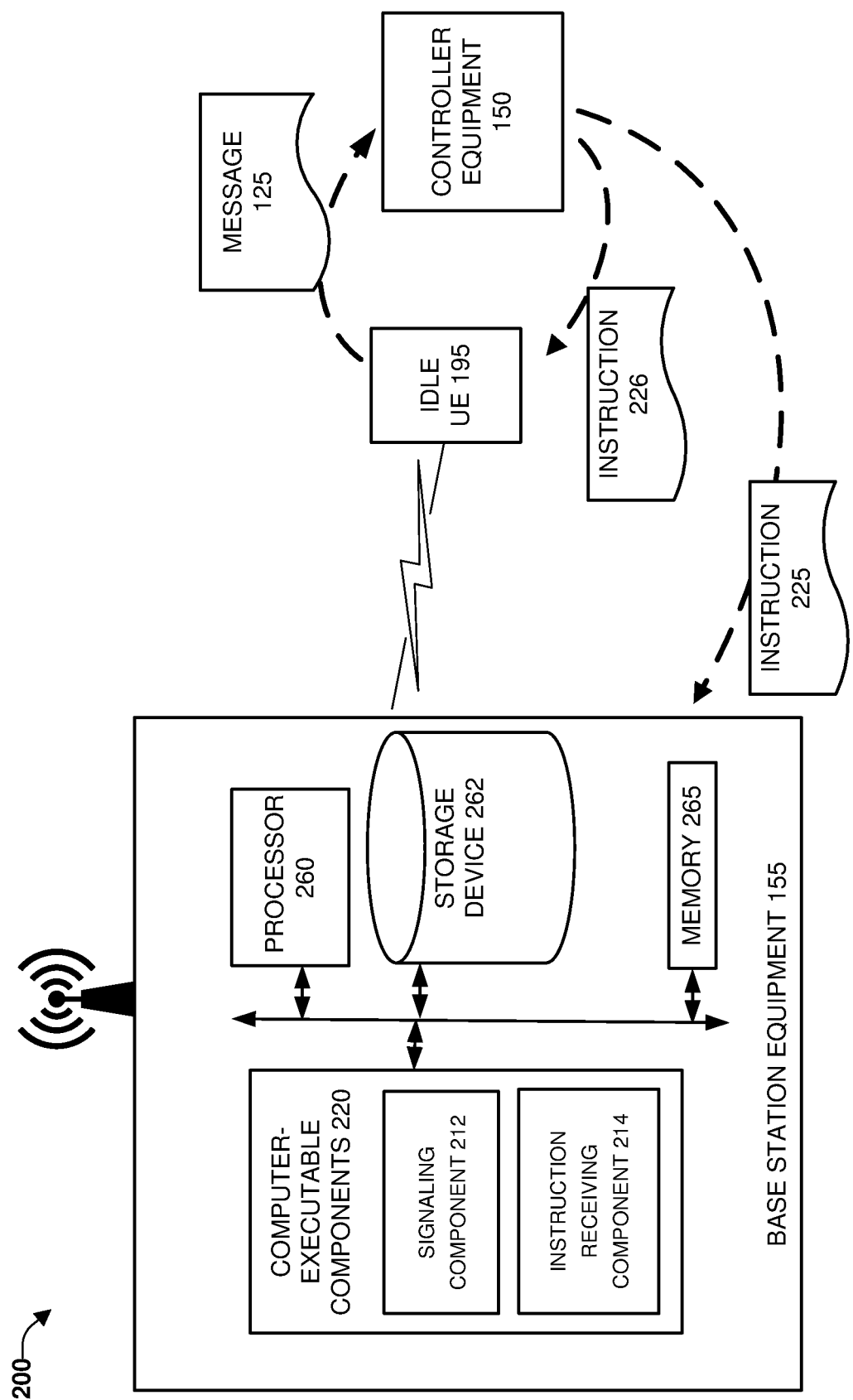
FIG. 2 is a diagram of a non-limiting example system that can facilitate generating a propagation model based on sampling by user equipment in idle mode, in accordance with one or more embodiments.

FIG. 2 is a diagram of a non-limiting example system 200 that can facilitate generating a propagation model based on sampling by user equipment in idle mode, in accordance with one or more embodiments. For purposes of brevity, description of like elements and/or processes employed in other embodiments is omitted.

As depicted, system 200 can include controller equipment 150 communicatively coupled to base station equipment 155. Based on different conditions discussed herein, base station equipment 155 can receive instruction 225 from controller equipment 150, e.g., to adjust signal settings based on a propagation model generated by one or more embodiments. As discussed further below, to facilitate message 125 being a modified version of an existing type of message, controller equipment 150 can send instruction 226 to idle UE 195 to implement many of the messaging functions described herein. In one or more embodiments, base station equipment 155 can include computer executable components 220, processor 260, storage device 262, and memory 265.

In system 200, computer executable components 220 can include signaling component 212, instruction receiving component 214, and other components described or suggested by different embodiments described herein that can improve the operation of system 200. For example, in some embodiments, base station equipment 155 can further comprise various computer and/or computing-based elements described herein with reference to mobile handset 900 of FIG. 9 and operating environment 1000 described with FIG. 10.

For example, in one or more embodiments, computer executable components 220 can be used in connection with implementing one or more of the systems, devices, components, and/or computer-implemented operations shown and described in connection with FIG. 2 or other figures disclosed herein. For example, in one or more embodiments, computer executable components 220 can include instructions that, when executed by processor 260, can facilitate performance of operations defining signaling component 212. As discussed with FIGS. 3-6 below, in one or more embodiments, signaling component 212 transmit a first signal toward a first location in a sector area of the base station device, wherein a first network device in idle mode measures the first signal at the first location and stores results for later transmission as a first measurement. For example, in one or more embodiments, as described with FIG. 1 above, signaling component 212 of base station 155 can transmit a first signal toward a location in sector area 102, and this signal can be intercepted and measured by idle UE 195, with results stored for later transmission as a first measurement provided to controller equipment 150 in one or more of the approaches described below.

One approach that can be used by one or more embodiments to provide information about collected signal samples, is to add signal collection information to an existing UE message. An example signal information providing message is a radio resource message, generated by a UE based on different triggering events or in response to a request from network administration processes for particular information, e.g., handover messages can be generated by the UE based on events such as a diminishing signal strength. Being a message generated and provided in substantially real time by active UEs, these messages are generally not generated and communicated by idle UEs. As discussed further below, one or more embodiments can combine signaling information from active UEs with information gathered by idle UEs to generate propagation models.

For idle UEs that do not typically generate substantially real-time radio resource update messages, because idle UEs already periodically communicate different types of information to network administration processes at different times, to reduce the administrative overhead of implementing one or more embodiments, idle mode collected signal and location information can be added as a new part of an existing type of idle UE message 125. To implement this 'piggyback' approach, UEs can be configured, e.g., by instruction 226 instructing idle UE 195 to modify standard messages to further include additional information useful for one or more embodiments, e.g., UE global positioning system (GPS) location and ambient signal information described herein. For example, in one or more embodiments during the regular generation and sending of an existing network administration message (e.g., a tracking area update message, discussed below), the information generated by one or more embodiments can be added to the existing message, e.g., with the use of existing unused data fields or by repurposing existing data fields, e.g., as shown with the discussion of FIG. 6 below.

An example general type of message that can be used by one or more embodiments described herein is an idle message, e.g., messages that can be generated by the UE during a time when the UE is not actively wirelessly communicating with the network in a call or exchanging mobile data. In one or more embodiments, idle messages can be generated based on a UE actively collecting information even though the UE is in an idle state. In one or more embodiments, for some idle messaging the collected information can be collected stored before being used to generate an idle message that is sent periodically, e.g., a tracking area update message.

Generally speaking, tracking area updates are messages sent by a UE to the network that can be used to inform the network when the UE, in an idle communication state, moves from one tracking area to another, e.g., often termed mobility messages because they can facilitate an idle UE being located by a paging message, even if it changes tracking areas while idle. In some implementations, a tracking area update message can also be generated and sent by a UE at a particular time interval, with this interval potentially being changed as described below by one or more embodiments.

It is appreciated by one having skill in the relevant art(s) that when idle UE 195 detects that is has moved from one tracking area to another, the UE can subsequently transmit a tracking area update message by briefly transitioning out of the idle state of communications to receive the signals that can indicate the tracking area change and to communicate the update message to network administration processes. In addition, the idle state of communications can be used by the UE to reduce power consumption from communications processes but does not mean that the UE is not performing processing operations.

For these tracking area update examples, it should be noted that, in many circumstances, a tracking area can refer to a collection of radio cells that can vary in size based on terrain and reception characteristics. Because of this, a tracking area can vary in size up to being hundreds of square kilometers, e.g., a tracking area update does not generally provide a granular indication of the location of a UE, as can be provided by global navigation satellite systems (GNSS). Thus, while tracking area update messages can be described as facilitating a tracking of location by controller equipment 150 within a broad area, this tracking is generally not sufficient to allocate antenna resources for the types of functions (e.g., accelerated connections to mode transitioning UEs) described with some embodiments herein.

In addition to modifying an existing messaging procedure by adding (potentially unrelated) information to message 125, one or more embodiments can alter procedures by which the existing messages are sent. For example, as noted above, messages can be sent based on different events, e.g., based on a request, based on a change in signal strength, based on a change to a different tracking area, or at particular intervals. For one or more embodiments, to facilitate achieving the goals of the newly generated and sent information, the triggering events for sending the tracking area update message can be changed.

With respect to the message triggering events, it should be noted that one or more embodiments can beneficially alter the conditions to facilitate use of the appended information, while preserving the original function of the altered message 125. For example, because the tracking area update message is triggered to be sent at a particular interval, in one or more embodiments, this interval can be reduced, e.g., to establish an increased granularity for the existing messaging because, for example, the signal and GPS location data described herein can be more useful if received more frequently by controller equipment 150. In one or more embodiments, the extra processing and battery overhead for the UE from the increased frequency of sending a tracking area update can be compared to the utility of the extra information provided for network administration.

In another example, in one or more embodiments, computer executable components 220 can include instructions that, when executed by processor 260, can facilitate performance of operations defining, instruction receiving component 214. Instruction receiving component 214 can, in accordance with one or more embodiments, based on a propagation map generated by a controller device, receive an instruction (e.g., instruction 225), from controller equipment 150, to alter a characteristic of a second signal to be transmitted by the base station device to a second location in the sector area, with the propagation map being generated based on the first measurement, wherein a model of signal transmission in the sector area was generated based on the first measurement.

Figure 3:
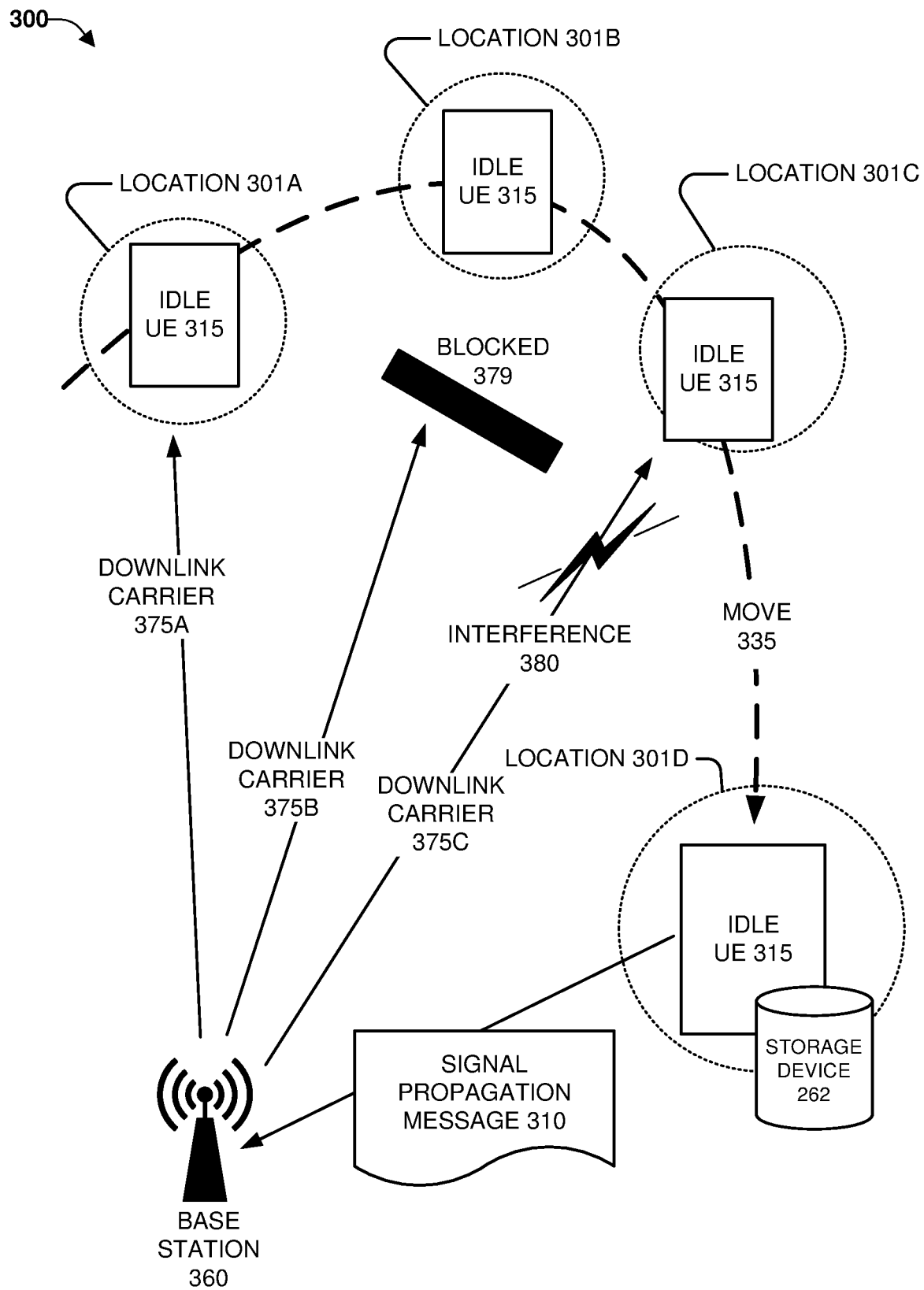
FIG. 3 is a diagram of a non-limiting example system that can facilitate generating a propagation model based on sampling by user equipment in idle mode, in accordance with one or more embodiments.

Example types of signal and location data that can be collected, along with the uses for which one or more embodiments can apply the collected data, as described with FIGS. 3-6 below. One approach to collecting signal information by base station equipment 155 is by using idle channel measurements from the phone from system information block (SIB) messages as well as master information block (MIB) messages FIG. 3 is a diagram of a non-limiting example system 300 that can facilitate generating a propagation model based on sampling by user equipment in idle mode, in accordance with one or more embodiments. For purposes of brevity, description of like elements and/or processes employed in other embodiments is omitted. System 300 includes locations 301A-C where idle UE 315 moves, where downlink carriers 375A-C are respectively directed to the three locations at the same time idle UE 315 is at the locations. Location 301D depicts a position where the idle UE 315 is triggered to transmit signal propagation message 310 to base station 360, with this message including the previously gathered samples stored in storage device 262.

Carriers 375A-C are respectively communicated to locations 301A-C by base station 360. In one or more embodiments, a propagation model can be generated for a sector area of base station 360 and locations 301A-C can be selected for the test carrier signals based on these areas being inside the sector area sought to be measured. As discussed further below, different characteristics of modern networks can make propagation modeling even more important for network functions.

In one or more embodiments, base station 360 can be a fifth or later generation network base station. One having skill in the relevant art(s), given the discussion herein, understands that 5G networks that may use waveforms that split the bandwidth into several sub-bands, with different types of services being accommodated in different sub-bands with complementary waveform and numerology, e.g., leading to improved spectrum utilization for 5G networks. In some implementations, base station 360 can use the mmWave spectrum, with the millimeter waves have shorter wavelengths relative to other communications waves, and thus potentially experiencing higher degrees of path loss, penetration loss, and fading than larger wavelength signals.

In one or more embodiments, the shorter wavelength at mmWave frequencies can also enable more antennas to be located in the same physical dimension, which can enable large-scale spatial multiplexing and highly directional beamforming, e.g., with phased antenna arrays it is possible to create and control the shape and direction of the signal beam from multiple antennas based on the antenna spacing and the phase of signal from each antenna element in the array. In some circumstances, the more radiating elements that make up the antenna, the narrower the beam.

In an example depicted in FIG. 3, to facilitate generating different propagation models as described herein, base station 360 can periodically send out carrier signals (e.g., downlink carriers 375A-C) directed to different locations reachable by an antenna of base station 360 (e.g., antenna sector area 102 discussed above), e.g., locations 301A-C. One or more embodiments can gather information about the path loss of downlink carriers 375A-C in directions towards locations 301A-C and at locations 301A-C, e.g., via periodic samples collected by idle user equipment (e.g., idle UE 315). It should be appreciated that in addition to, or instead of a single idle UE 315 collecting samples, samples generated over time by many different types of signal receiving devices can be combined, e.g., idle UEs, active UEs, and other base station equipment. In addition, as described with FIG. 4 below, sample data measurements for areas without recent sample collection can also be extrapolated from existing samples.

Continuing this example, as idle UE 315 is moved 335 (e.g., by a user), because base station 360 is periodically sending out signals in different directions, occasionally, idle UE 315 will intersect with a signal from base station 360. As would be appreciated by one having skill in the relevant art(s), given the description herein, carrier signals 375A-C can have different characteristics including but not limited to band, channel within band, and signal strength, with different characteristics being stored by base station 360 for later use in path loss analysis. It should be noted that, while carrier signals 375A-C can have characteristics selected for, and be transmitted in particular directions specifically for testing purposes, carrier signals 375A-C can also be functional signals transmitted as a part of communication within the network.

For example, downlink carrier 375A can have been directed to an active UE (not shown) as a part of a communications session, but also can have been sampled at location 301A by idle UE 315. This situation can provide additional useful data because samplings can be provided for downlink carrier 375A from location 301A as well as a different location closer or farther away from location 301A.

Continuing this example, in the signal interception shown at location 301A, downlink carrier has characteristics similar to those described above, and is directed toward location 301A. In one or more embodiments, idle UE 315 has been selected to periodically (e.g., at an interval or randomly) sample for radio waves within selected spectra. This periodic sampling has been selected to provide samples while still conserving the battery power of idle UE 315, as can be a purpose of some idle mode implementations.

The sampling time and the time of downlink carrier 375A coincidently intersect, and idle UE detects downlink carrier 375A, along with interference associated with carrier 375A (e.g., if the interference is within the sampled spectra specification). Upon detecting a sample, idle UE 315 uses a location determining technology to identify the receipt location of the sample. Once the combination of elements including, but not limited to, time, location, and signal characteristics, are collected, the sample can be stored in storage device 262 for later upload, e.g., to conserve battery in idle mode by not frequently transmitting information.

In a variation of this approach, one or more embodiments receive propagation data from downlink carrier 375A that is beyond the characteristics of the signal discussed above. In one or more embodiments, idle UE 315 can receive and demodulate the signal to identify useful propagation information including, but not limited to, an identifier that identifies base station 360, as well as an identifier that identifies the particular transmission of downlink carrier 375A. This information can also be stored in storage device 262 with the other sample data discussed above.

Continuing this example, at location 301B, idle UE 315 is in a position to intersect with downlink carrier 375B. In one or more embodiments, at the time of the periodic sampling, if no signals are detected, this can be stored in storage device 262 as a sample. Because in this example, downlink carrier 375B is blocked 379, idle UE 315 does not detect the carrier. At location 301C, the periodic sampling of idle UE 315 is again triggered, and both downlink carrier 375C and interference 380 are detected and added to a time stamped location sample.

At location 301D, a triggering event occurs that causes idle UE 315 to generate and communicate signal propagation message 310 to base station 360. In an example, from base station 360 the sample data can be received by controller equipment 150, e.g., by attenuation estimating component 122. For the sample collected at location 301A, antenna pattern component 124 can identify the source of the signal as base station 360, e.g., either by correlating the time and location the sample was received with the record of the transmission of downlink carrier 375A, or by identifying the cell ID of base station 360, if this information was determined from the signal. Once base station 360 and the particular sample are identified, the data described above can be accessed and used for analysis, e.g., the location of base station 360 and characteristics of downlink carrier 375A such as transmission power, antenna aiming, etc.

One having skill in the relevant art(s), given the description herein appreciates how the data sampling approach above can be used to determine different path loss measurements for base station 360, e.g., especially when combined with many devices over time.

For the sample collected at location 301B, the lack of any signal at that location can be cross referenced with signals that should have been detectable at that location, and information regarding downlink carrier 375B can be determined, e.g., the existence of block 379. Once again, the combination of many samples can provide additional correlating data for different conclusions. For the sample collected at location 301C, interference 380 can be noted, and available information can be used to determine the source of the interference, e.g., transmission from another base station of the network. This base station can be identified in a similar way as base station 360 was identified (e.g., signals transmitted in a direction at a time), or a cell ID of the different base station could be available, as discussed above. It should be noted that block 379 and interference 380 represent causes of signal propagation changes that can be a combination of one or more of transient, periodic, semi-permanent, regular, and irregular interruptions and, by utilizing sampling from idle UEs, one or more embodiments can facilitate detecting these characteristics in ways that differ from the use of only active UE sampling.

With reference to samples from different base stations being correlated with each other by controller equipment 150, it should be noted that, for one or more of the signal propagation messages described herein, the data regarding a base station does not need to be delivered to the base station in order to be interpreted, e.g., any base station can receive the samples and forward to controller equipment 150.

Figure 4:
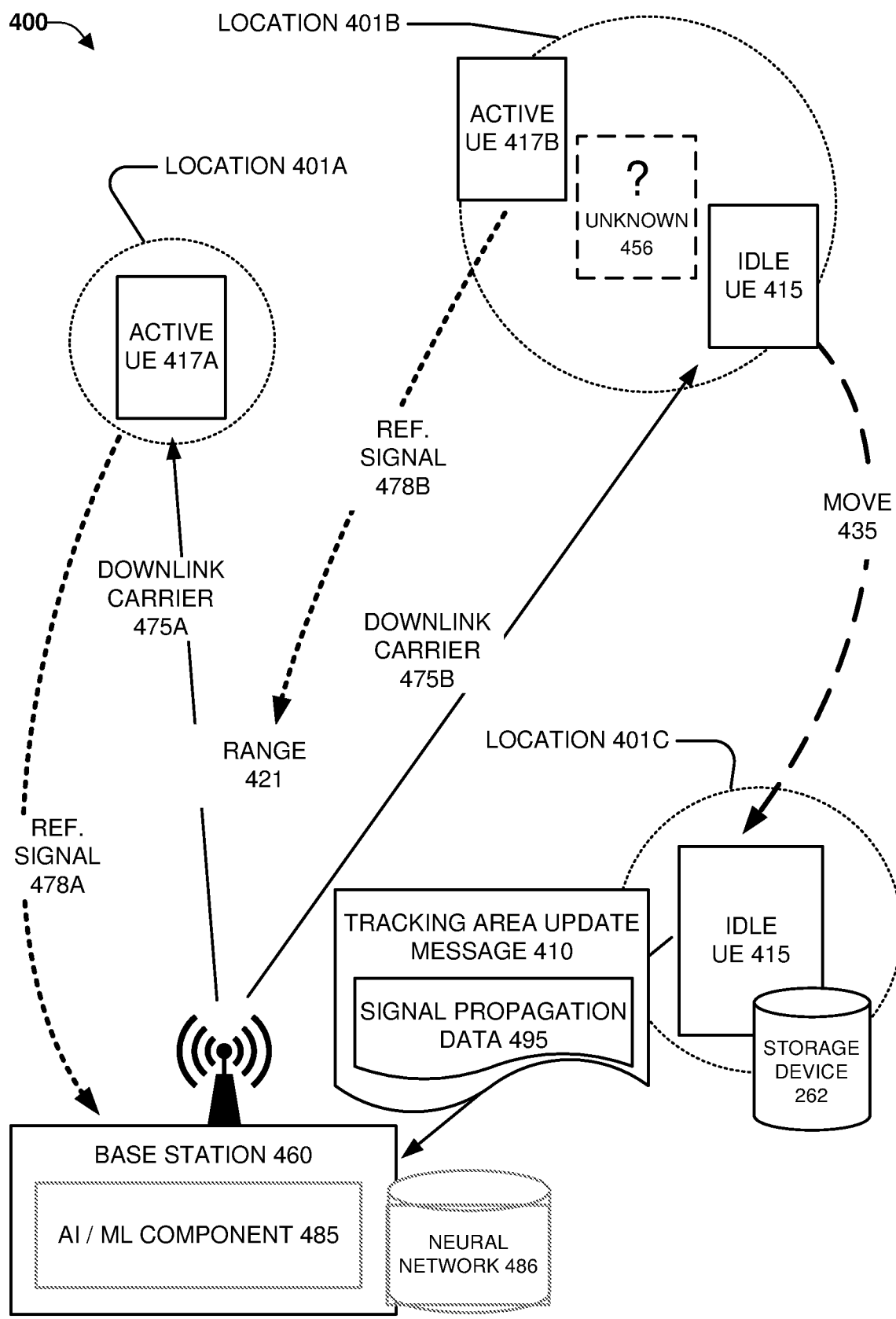
FIG. 4 depicts is a diagram of a non-limiting example system 400 that can facilitate mapping signal propagation by combining samples from active and idle user equipment, in accordance with one or more embodiments.

FIG. 4 depicts is a diagram of a non-limiting example system 400 that can facilitate mapping signal propagation by combining samples from active and idle user equipment, in accordance with one or more embodiments. For purposes of brevity, description of like elements and/or processes employed in other embodiments is omitted. System 400 includes active UE 417A at location 401A, active UE 417B and idle UE 415 at location 401B, and idle UE 415 moving 435 to location 401C to transmit tracking area update message 410 with an added portion for signal propagation data 495 from storage device 262.

At location 401A an example of an active UE 417A providing a reference signal 478A to base station 460 in response to downlink carrier 475A. For active UE 417A base station 460 can receive updated information and track the UE position with reference signals frequently provided to base station 360 to enable rapid performance of functions including, but not limited to cell selection and reselection, seamless handover from one cell to another, mobility measurements, and estimating propagation values for power control calculations.

One or more embodiments can supplement or substitute for signal propagation data from active UEs based on data systematically collected by idle UEs and combined together over time. At any given time in wireless networks, there are many more idle UEs than active UEs. Even with one or more embodiment selecting a subset of idle UEs for periodic data collection, a large number of samples can be collected and used to determine initial path losses for signals, as well as updating the signals over time.

In the example depicted in location 401B, one or more embodiments can determine information regarding both downlink and uplink signals. One having skill in the relevant art(s), given the disclosure herein, understands that many approaches to determining the range of base stations is to measure downlink signals, while not always determining that uplink signals from the user equipment can be received by the transmitting source of the downlink signals.

As depicted in FIG. 4, both active UE 417B and idle UE 415 receive downlink carrier 475B. In this example, active UE 417B attempts to send an acknowledgement of receipt with reference signal 478B, but this signal does not have the range 421 to reach base station 460. Because many UEs will not store sampled signals over time, in many circumstances, this information regarding the uplink associated with downlink carrier 475B will be abandoned.

In one or more embodiments, to address this issue, as described herein, idle UE 415 receives and samples downlink carrier 475B, then stores the sample information in storage device 262 until tracking area update message 410 is triggered and is sent along with signal propagation data 495. Once this information is analyzed by modeling component 126, in one or more embodiments, the collected sample from idle UE 415 can be cross referenced with the location of active UE 417B at the time the sample was collected. The lack of response from active UE 417B thus becomes additional data to assessing the downlink and return uplink path loss of downlink carrier 475B.

An additional aspect of one or more embodiments illustrated by FIG. 4 concerns the active adjustment of signals communicated to active UE 417A. Approaches to antenna aiming for some base stations can involve the use of dynamically moving antenna elements in different circumstances, as well as approaches where a beam pattern can be dynamically directed by changing the signal phase in real time without changing the antenna elements or other hardware, e.g., beamsteering. Because idle UE 415 is idle, and thus not actively sharing a location or connection specifics, these active measures generally cannot be applied to sample signals received by these devices in idle mode. One or more embodiments can assess the impact of the differences in signal optimization between active and idle UEs, when using idle UE samples and these samples from samples from other sources, as described herein.

In one or more embodiments, generating the propagation model by modeling component 126 can include a process whereby the propagation model is generated based on a geographic grid of path loss values for locations within the geographic area, e.g., sector area 102. In an approach to generating the model, other collected path loss values assessed by attenuation estimating component and the antenna pattern determined by antenna pattern component 124, can be used to supplement areas of the grid that may have been the subject of fewer samples, e.g., supplemented by estimating a path loss value for the areas. In some circumstances, the size of the grid used (e.g., the bounds of the sector area for which the propagation model was generated), can be determined by collected samples.

For example, as depicted in FIG. 4, samples can have been collected from location 401B by active UE 417B and idle UE 415. As is appreciated by one having skill in the relevant art(s), different approaches can be used to estimate signal propagation information for areas based on signal measurements from other, proximate areas, e.g., unknown area 456 being estimated based on the samples collected by active UE 417B and idle UE 415 from location 401B. In one or more embodiments, generating the propagation model can include processes that employ artificial intelligence approaches, e.g., by employing machine learning. For example, AI/ML component 485 can be a neural network (also termed an artificial neural network (ANN)) that can be continually trained based on signal samples collected by both active UEs 417A-B and idle UEs 415

Returning to the example discussed above, one or more embodiments can employ AI/ML component 485 to supplement samples for lower volume measurement areas noted above. For example, one or more embodiments can determine, based on samples from active UE 417B and idle UE 415, that in one part of location 401B, UEs tend to receive signals with a −115 decibel pathloss in two (2) bins of a given one (1) meter binned grid. In this example, unknown area 456 corresponds to a bin between the two measured bins. In this example, the adject unmeasured bin of unknown 456 could be estimated using the information from the adjacent bin measurements and the known antenna pattern.

In one or more embodiments, the grid information can be used to tune a specific sector carrier propagation model on an ongoing basis, with changes to path loss due to construction, clutter growth, etc. being captured quickly and efficiently, to ensure wireless coverage in the changing environment can be adjusted to remain accurate. As noted above, this technique of optimization, tuning, and pathloss-capture can provide beneficial results in both analog and digital beamforming approaches, as well as the traditional/legacy transmission methods.

In an example, non-limiting implementation of AI/ML component 485, the neural network employed can use information organized based on a deep machine learning process. In this example, the neural network can comprise a convolutional neural network (CNN). In this CNN, in one or more embodiments, a matrix filtering process can be used to apply a filter to convolute identified features of collected signal data, resulting in a matrix of weighted values, with the filter being based on the propagations of signals in conditions indicated by collection points and times for the different samples, whether samples were collected in active or idle mode. Approaches utilized by one or more embodiments can thus generate a propagation model for a geographic area by combining features from the matrix of weighted values with features of the geographic area, e.g., by overlaying the features indicated by the weighted values over a graphical representation of the geographic area.

FIG. 5 is a diagram of a non-limiting example addendum to administrative messages that can provide additional antenna resource allocating information, in accordance with one or more embodiments. For purposes of brevity, description of like elements and/or processes employed in other embodiments is omitted.

As depicted, an example mobility update addendum 510 can include, but is not limited to the following characteristics of signals: frequency of signal analyzed 520A, power level of signal analyzed 520B, UE calculated pathloss 520C, location of UE at sample collection 520D, current location 520E, effective isotropic radiated Power (EIRP) 520F, evolved universal terrestrial radio access network (E-UTRAN) cell global identifier (ECGI) of cell 520G, physical cell identifier (PCI) 520H, current frequency of carrier measured 520I, reference signal received power (RSRP) of serving cell, beam ID 520J, idle channel measurements from the phone 520K, power allocation setting of UE 520L, and model of UE 520M.

Figure 6:
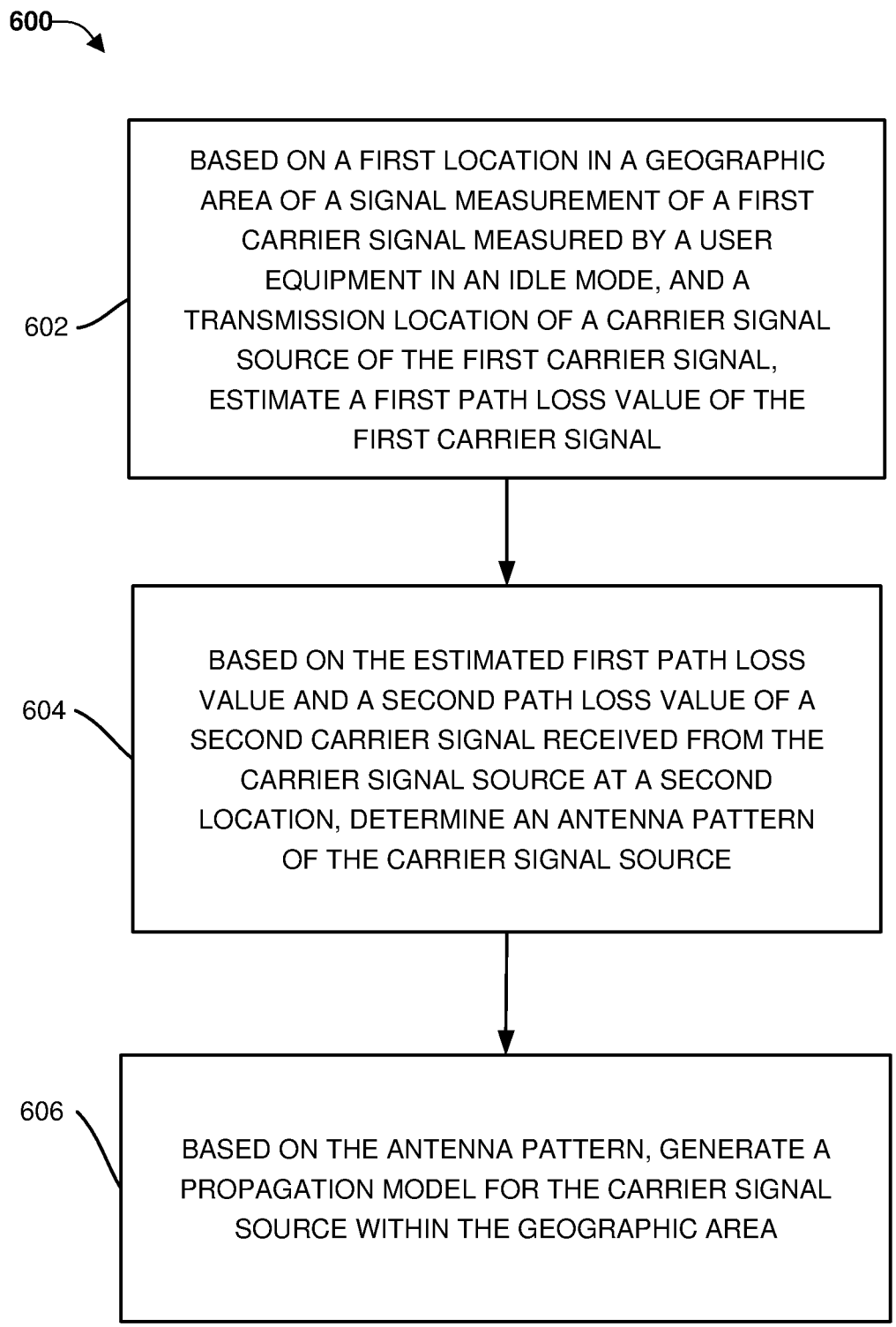
FIG. 6 illustrates an example method 600 that can facilitate generating a propagation model based on sampling by user equipment in idle mode, in accordance with one or more embodiments.

FIG. 6 illustrates an example method 600 that can facilitate generating a propagation model based on sampling by user equipment in idle mode, in accordance with one or more embodiments. For purposes of brevity, description of like elements and/or processes employed in other embodiments is omitted. At 602, method 600 can include, based on a first location in a geographic area of a signal measurement of a first carrier signal measured by a user equipment in an idle mode, and a transmission location of a carrier signal source of the first carrier signal, estimating an estimated first path loss value of the first carrier signal. For example, in one or more embodiments a method can include, based on a first location in sector area 102 measured by idle UE 195, and a transmission location of a carrier signal source, base station 155, estimating an estimated first path loss value of the first carrier signal.

At 604, method 600 can include, based on the estimated first path loss value and a second path loss value of a second carrier signal received from the carrier signal source at a second location, determining an antenna pattern of the carrier signal source. For example, in one or more embodiments a method can, based on the estimated first path loss value and a second path loss value of a second carrier signal received from the carrier signal source at a second location, determining by antenna pattern component 124, an antenna pattern of the carrier signal source.

At 606, method 600 can include based on the antenna pattern, generating a propagation model for the carrier signal source within the geographic area. For example, in one or more embodiments a method can include based on the antenna pattern, generating by modeling component 126, a propagation model for the carrier signal source within the geographic area.

Figure 7:
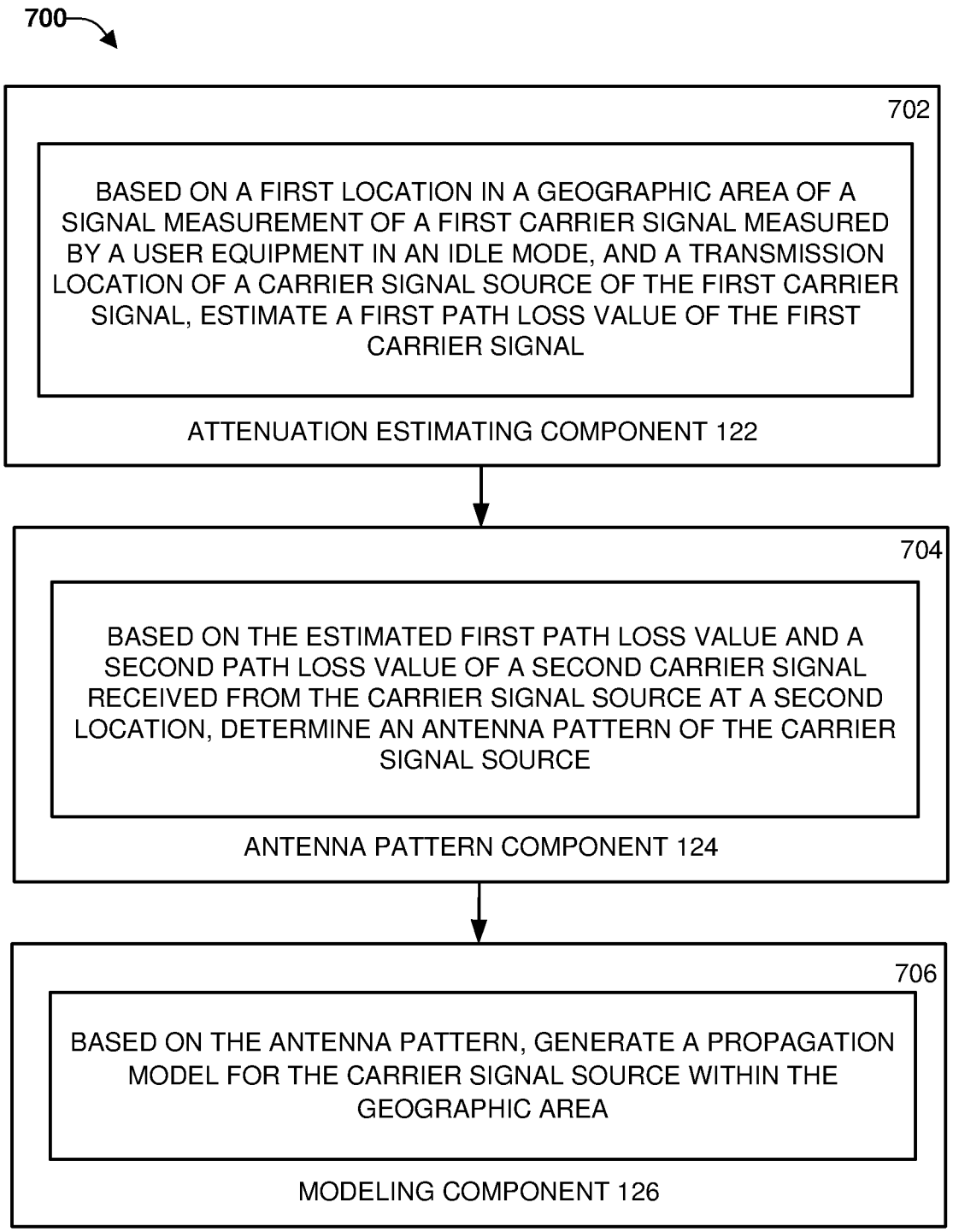
FIG. 7 depicts a system 700 that can facilitate generating a propagation model based on sampling by user equipment in idle mode, in accordance with one or more embodiments.

FIG. 7 depicts a system 700 that can facilitate generating a propagation model based on sampling by user equipment in idle mode, in accordance with one or more embodiments. For purposes of brevity, description of like elements and/or processes employed in other embodiments is omitted. As depicted, system 700 can include attenuation estimating component 122, antenna pattern component 124, modeling component 126, and other components described or suggested by different embodiments described herein, that can improve the operation of system 700.

In an example, component 702 can include the functions of attenuation estimating component 122, supported by the other layers of system 700. For example, component 702 can, based on a first location in a geographic area of a signal measurement of a first carrier signal measured by a user equipment in an idle mode, and a transmission location of a carrier signal source of the first carrier signal, estimate an estimated first path loss value of the first carrier signal. For example, one or more embodiments can, based on a first location in a geographic area of a signal measurement of a first carrier signal measured by idle UE 195 and a transmission location of base station 155, estimate an estimated first path loss value of the first carrier signal.

In this and other examples, component 704 can include the functions of antenna pattern component 124, supported by the other layers of system 700. Continuing this example, in one or more embodiments, component 704 can, based on the estimated first path loss value and a second path loss value of a second carrier signal received from the carrier signal source at a second location, determine an antenna pattern of the carrier signal source. For example, one or more embodiments can, based on the estimated first path loss value and a second path loss value of a second carrier signal received from base station equipment 155 at location 101, determine an antenna pattern of the carrier signal source.

In a further aspect of the example, component 706 can include the functions of modeling component 126, supported by the other layers of system 700. For example, component 706 can, based on the antenna pattern, generate a propagation model for the carrier signal source within the geographic area. For example, in one or more embodiments, modeling component 126 of controller equipment 150 can, based on the antenna pattern, generate by modeling component 126, a propagation model for the carrier signal source within the geographic area.

Figure 8:
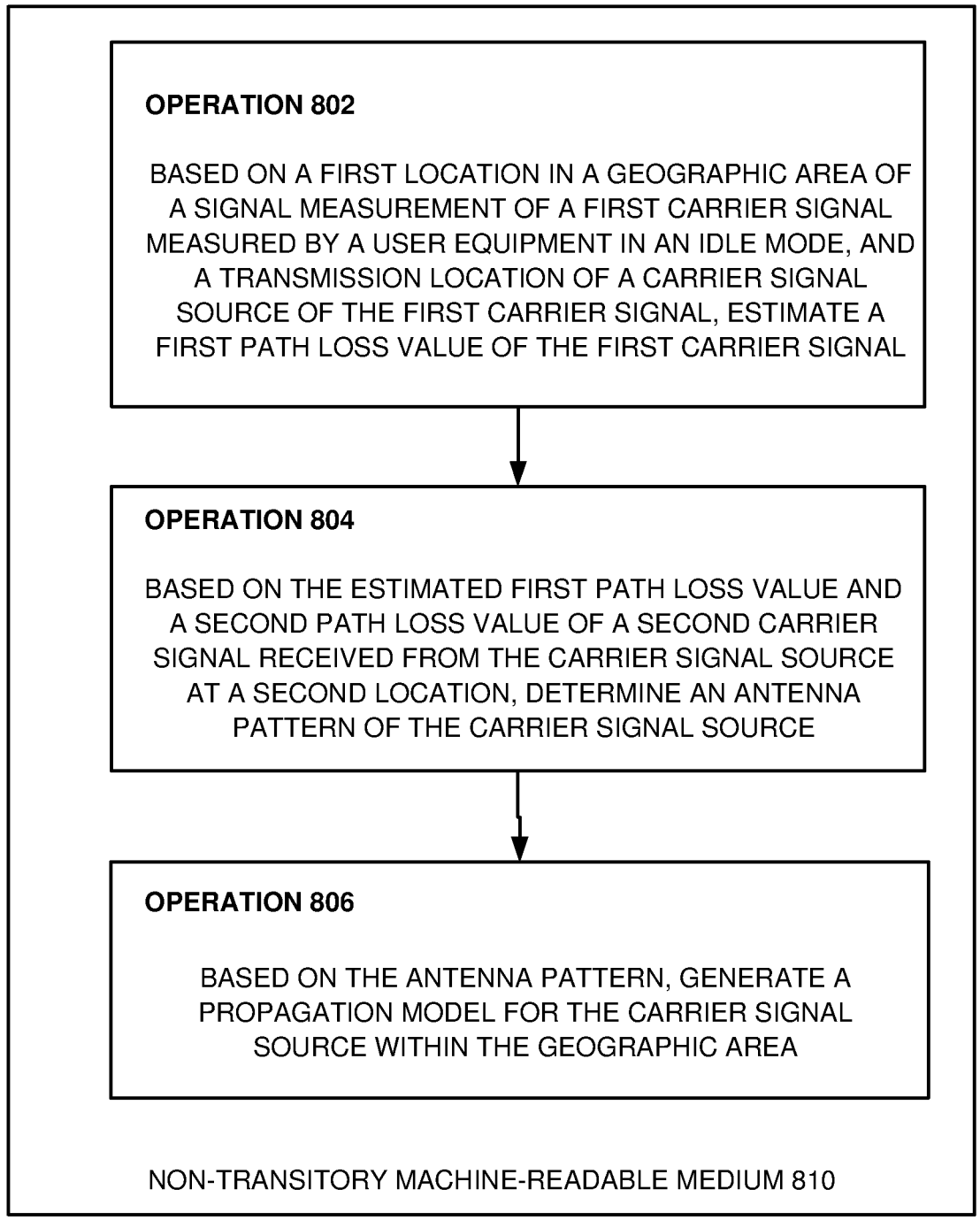
FIG. 8 depicts an example 800 non-transitory machine-readable medium 810 that can include executable instructions that, when executed by a processor of a system, facilitate generating a propagation model based on sampling by user equipment in idle mode, in accordance with one or more embodiments described above.

FIG. 8 depicts an example 800 non-transitory machine-readable medium 810 that can include executable instructions that, when executed by a processor of a system, facilitate generating a propagation model based on sampling by user equipment in idle mode, in accordance with one or more embodiments described above. For purposes of brevity, description of like elements and/or processes employed in other embodiments is omitted. As depicted, non-transitory machine-readable medium 810 includes executable instructions that can facilitate performance of operations 802-806.

In one or more embodiments, the operations can include operation 802 that can, based on a first location in a geographic area of a signal measurement of a first carrier signal measured by a user equipment in an idle mode, and a transmission location of a carrier signal source of the first carrier signal, estimate an estimated first path loss value of the first carrier signal. Further, operations can include operation 804, that can, based on the estimated first path loss value and a second path loss value of a second carrier signal received from the carrier signal source at a second location, determine an antenna pattern of the carrier signal source.

In one or more embodiments, the operations can further include operation 806 that can, based on the antenna pattern, generate a propagation model for the carrier signal source within the geographic area. For example, one or more embodiments can, based on the antenna pattern, generate a propagation model for the carrier signal source within the geographic area.

Figure 9:
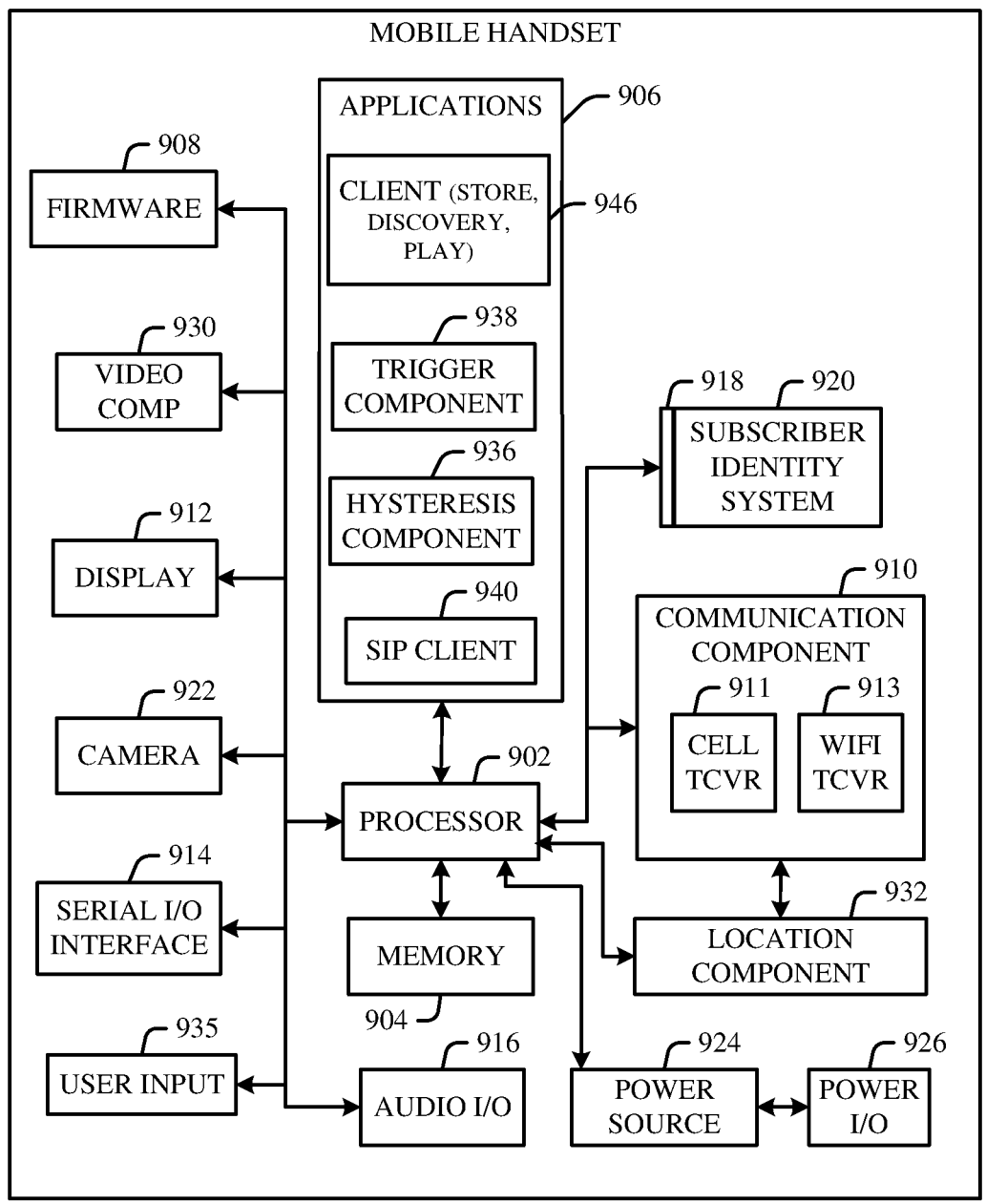
FIG. 9 illustrates an example block diagram of an example mobile handset operable to engage in a system architecture that facilitates wireless communications according to one or more embodiments described herein.

FIG. 9 illustrates an example block diagram of an example mobile handset 900 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein.

The following discussion is intended to provide a brief, general description of an example of a suitable environment in which the various embodiments can be implemented. While the description includes a general context of computer-executable instructions embodied on a machine-readable storage medium, those skilled in the art will recognize that the embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and can include any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media The handset includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1294) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card SIM or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or a decoded format.

A video processing component 922 (e.g., a camera) can be provided for decoding encoded multimedia content. The video processing component 922 can aid in facilitating the generation, editing, and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Network 190 can employ various cellular systems, technologies, and modulation schemes to facilitate wireless radio communications between devices. While example embodiments include use of 5G new radio (NR) systems, one or more embodiments discussed herein can be applicable to any radio access technology (RAT) or multi-RAT system, including where user equipment operate using multiple carriers, e.g., LTE FDD/TDD, GSM/GERAN, CDMA2000, etc. For example, wireless communication system 200 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the user equipment. The term carrier aggregation (CA) is also called (e.g., interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

Various embodiments described herein can be configured to provide and employ 5G wireless networking features and functionalities. With 5G networks that may use waveforms that split the bandwidth into several sub bands, different types of services can be accommodated in different sub bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Figure 10:
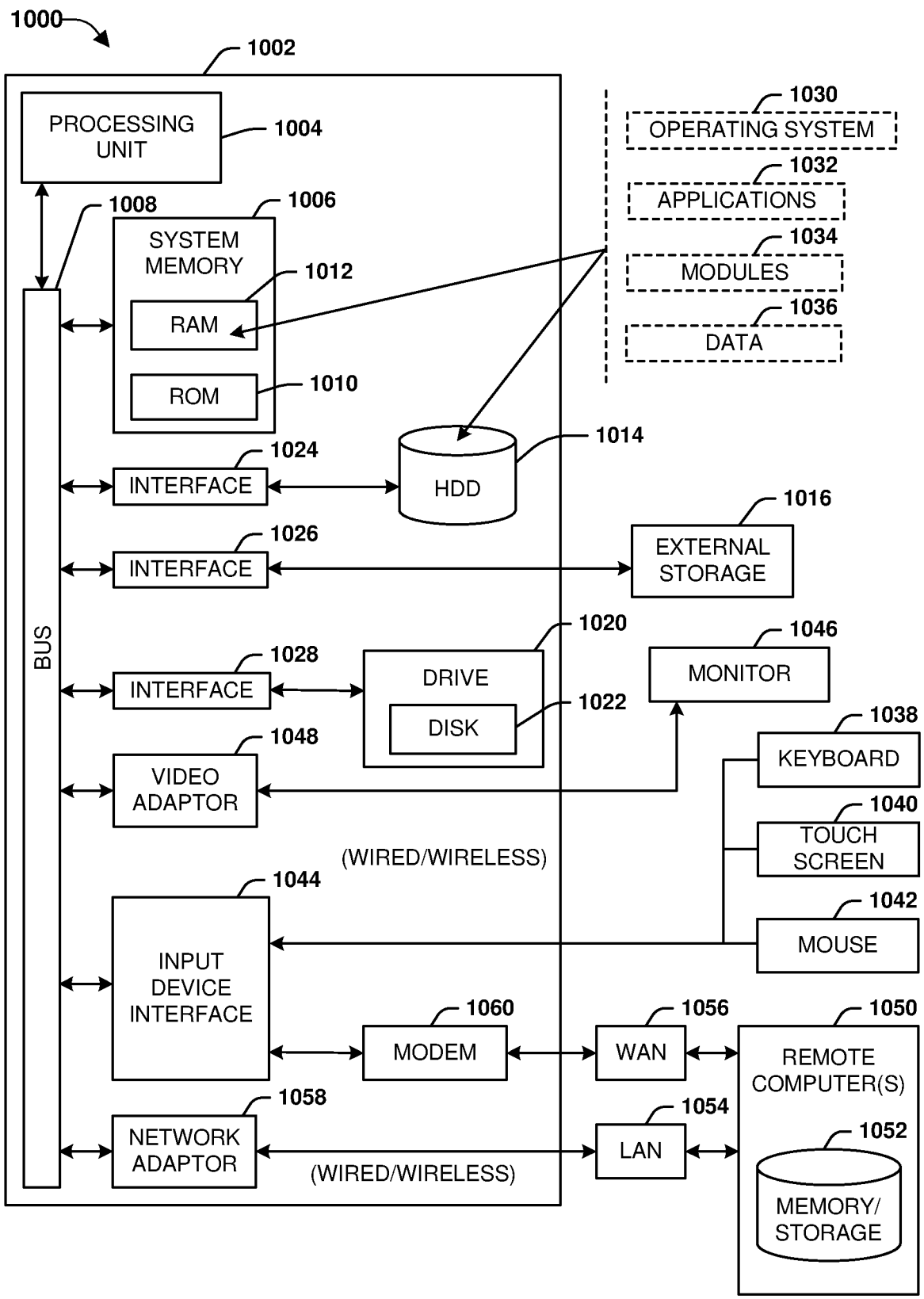
FIG. 10 provides additional context for various embodiments described herein, intended to provide a brief, general description of a suitable operating environment in which the various embodiments of the embodiment described herein can be implemented.

FIG. 10 provides additional context for various embodiments described herein, intended to provide a brief, general description of a suitable operating environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms can be used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example operating environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and a drive 1020, e.g., such as a solid-state drive, an optical disk drive, which can read or write from a disk 1022, such as a CD-ROM disc, a DVD, a BD, etc. Alternatively, where a solid-state drive is involved, disk 1022 would not be included, unless separate. While the internal HDD 1014 is illustrated as located within the computer 1002, the internal HDD 1014 can also be configured for external use in a suitable chassis (not shown). Additionally, while not shown in environment 1000, a solid-state drive (SSD) could be used in addition to, or in place of, an HDD 1014. The HDD 1014, external storage device(s) 1016 and drive 1020 can be connected to the system bus 1008 by an HDD interface 1024, an external storage interface 1026 and a drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1010, including an operating system 1030, one or more application programs 1032, other program modules 1034 and program data 1036. All or portions of the operating system, applications, modules, and/or data can also be cached in the RAM 1010. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above, such as but not limited to a network virtual machine providing one or more aspects of storage or processing of information. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

Further to the description above, as it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches, and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine-readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. User equipment do not normally connect directly to the core networks of a large service provider, but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g., call transfer) or implicitly (e.g., call waiting). It is to be noted that service "execution" may or may not be a core network functionality as third-party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like can be used in the detailed description, claims, appendices, and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used, or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be affected across a plurality of devices. Accordingly, the embodiments are not to be limited to any single implementation, but rather are to be construed in breadth, spirit, and scope in accordance with the appended claims.

What is claimed is:

1. A method, comprising:
based on a first location in a geographic area of a signal measurement of a first carrier signal measured by a user equipment in an idle mode, and a transmission location of a carrier signal source of the first carrier signal, estimating, by a system comprising a processor, an estimated first path loss value of the first carrier signal, wherein the signal measurement comprises characteristics of the first carrier signal measured by the user equipment while the user equipment was in the idle mode, wherein the signal measurement was stored at the user equipment and communicated based on an interval selected to manage a battery power of the user equipment, wherein the signal measurement was communicated as an appended portion of a mobility management message, wherein the appended portion was appended to the mobility management message by the user equipment, wherein the mobility management message comprises a tracking area update message, and wherein the interval was selected based on a selected frequency of signal measurements;
based on the estimated first path loss value and a second path loss value of a second carrier signal received from the carrier signal source at a second location, determining, by the system, an antenna pattern of the carrier signal source; and
based on the antenna pattern, generating, by the system, a propagation model for the carrier signal source within the geographic area.

2. The method of claim 1, wherein the carrier signal source comprises base station equipment, wherein the geographic area comprises an antenna sector associated with the base station equipment, and wherein the propagation model comprises a sector carrier propagation model associated with the base station equipment.

3. The method of claim 1, further comprising, based on the propagation model, facilitating, by the system, adjusting a parameter of transmission of the carrier signal source.

4. The method of claim 1, wherein the generating the propagation model comprises generating the propagation model based on a geographic grid of path loss values for locations within the geographic area, and wherein the method further comprises, based on the estimated first path loss value, the second path loss value, and the antenna pattern, estimating, by the system, a third path loss value for a third location within the geographic grid.

5. The method of claim 4, wherein a size of the geographic grid was determined based on the estimated first path loss value, and the second path loss value.

6. The method of claim 1, wherein the generating the propagation model comprises generating the propagation model by employing a neural network.

7. The method of claim 6, wherein the neural network comprises information organized based on a deep machine learning process.

8. The method of claim 6, wherein the neural network comprises a neural network trained with training data comprising signal measurements of carrier signals collected at locations within the geographic area by respective user equipment while in the idle mode.

9. The method of claim 8, wherein the neural network comprises a convolutional neural network employed by a process comprising applying a filter to convolute data corresponding to the signal measurements and the locations, resulting in a matrix of weighted values, wherein the filter is based on propagation of signals to the locations.

10. The method of claim 1, wherein the signal measurement comprises a first signal measurement and the user equipment comprises a first user equipment, and wherein the second path loss value was determined based on a second signal measurement collected by a second user equipment in an active mode.

11. A non-transitory machine-readable medium, comprising executable instructions that, when executed by a processor of a propagation modeling device, facilitate performance of operations, comprising:
based on a measurement of a communication signal measured at first location in a signaling area, and a transmission location of the communication signal by base station equipment, determining a first path attenuation value of the communication signal, wherein the measurement was measured by a user equipment in an idle mode, wherein the measurement comprises characteristics of the communication signal measured by the user equipment while the user equipment was in the idle mode, and wherein the measurement was stored at the user equipment and communicated based on an interval selected to manage a battery power of the user equipment, wherein the measurement was communicated as an appended portion of a mobility management message, and wherein the appended portion was appended to the mobility management message by the user equipment, and wherein the mobility management message comprises a tracking area update message, and wherein the interval was selected based on a selected frequency of signal measurements; and based on the first path attenuation value and a second path attenuation value associated with the base station equipment, generating a propagation model for the base station equipment.

12. The non-transitory machine-readable medium of claim 11, wherein the measurement comprises a signal measurement of the communication signal stored by the user equipment in the idle mode until the signal measurement was appended to a tracking area update of the user equipment.

13. The non-transitory machine-readable medium of claim 11, wherein the generating the propagation model comprises generating the propagation model based on a grid corresponding to the signaling area, and wherein the grid comprises grid values based on:

the first path attenuation value and the second path attenuation value, and an estimated path attenuation value that was derived based on a pattern of signal transmission within the signaling area derived from the first path attenuation value and the second path attenuation value.

14. The non-transitory machine-readable medium of claim 11, wherein the second path attenuation value was determined based on signal information provided by a second user equipment in an active mode.

15. A system, comprising:

a processor of a propagation modeling device comprising at least one processor; and a non-transitory machine-readable medium, comprising executable instructions that, when executed by the processor, facilitate performance of operations, the operations comprising:

based on a first location in a geographic area of a signal measurement of a first carrier signal measured by a user equipment in an idle mode, and a transmission location of a carrier signal source of the first carrier signal, estimating an estimated first path loss value of the first carrier signal, wherein the signal measurement comprises characteristics of the first carrier signal measured by the user equipment while the user equipment was in the idle mode, wherein the signal measurement was stored at the user equipment and communicated based on an interval selected to manage a battery power of the user equipment, wherein the signal measurement was communicated as an appended portion of a mobility management message, wherein the appended portion was appended to the mobility management message by the user equipment, wherein the mobility management message comprises a tracking area update message, and wherein the interval was selected based on a selected frequency of signal measurements;

based on the estimated first path loss value and a second path loss value of a second carrier signal received from the carrier signal source at a second location, determining an antenna pattern of the carrier signal source; and based on the antenna pattern, generating a propagation model for the carrier signal source within the geographic area.

16. The system of claim 15, wherein the carrier signal source comprises base station equipment, wherein the geographic area comprises an antenna sector associated with the base station equipment, and wherein the propagation model comprises a sector carrier propagation model associated with the base station equipment.

17. The system of claim 15, wherein the operations further comprise, based on the propagation model, facilitating adjusting a parameter of transmission of the carrier signal source.

18. The system of claim 15, wherein the generating the propagation model comprises generating the propagation model based on a geographic grid of path loss values for locations within the geographic area, and wherein the operations further comprise, based on the estimated first path loss value, the second path loss value, and the antenna pattern, estimating a third path loss value for a third location within the geographic grid.

19. The system of claim 18, wherein a size of the geographic grid was determined based on the estimated first path loss value, and the second path loss value.

20. The system of claim 15, wherein the generating the propagation model comprises generating the propagation model by employing a neural network.

* * * * *